(12) United States Patent
Harman et al.

(10) Patent No.: US 7,883,625 B2
(45) Date of Patent: Feb. 8, 2011

(54) REMOVAL OF OILS FROM SOLID SURFACES AND WATER WITH A SUBSTANCE HAVING A HIGH HUMATE LEVEL

(75) Inventors: Gary E. Harman, Geneva, NY (US); Terry D. Spittler, Geneva, NY (US); Steven F. Nielsen, Charlotte, NC (US); Bryan P. Thomas, York, SC (US)

(73) Assignee: Terrenew, LLC, Geneva, NY (US)

( * ) Notice: Subject to any disclaimer, the term of this patent is extended or adjusted under 35 U.S.C. 154(b) by 325 days.

(21) Appl. No.: 12/066,964

(22) PCT Filed: Sep. 18, 2006

(86) PCT No.: PCT/US2006/036346

§ 371 (c)(1),
(2), (4) Date: Sep. 15, 2008

(87) PCT Pub. No.: WO2007/035672

PCT Pub. Date: Mar. 29, 2007

(65) Prior Publication Data
US 2009/0200241 A1    Aug. 13, 2009

Related U.S. Application Data

(60) Provisional application No. 60/718,479, filed on Sep. 19, 2005.

(51) Int. Cl.
*B01D 15/00* (2006.01)
(52) U.S. Cl. .................. 210/660; 210/690; 210/691; 210/693
(58) Field of Classification Search .............. 210/660, 210/690, 691, 693
See application file for complete search history.

(56) References Cited

U.S. PATENT DOCUMENTS

| | | | | |
|---|---|---|---|---|
| 3,771,653 | A | * | 11/1973 | Harnett ................. 210/671 |
| 3,862,963 | A | * | 1/1975 | Hoshi et al. ............ 502/402 |
| 4,913,586 | A | | 4/1990 | Gabbita |
| 5,248,327 | A | | 9/1993 | Laker et al. |
| 5,252,215 | A | * | 10/1993 | McFarlane et al. ....... 210/691 |
| 5,271,772 | A | | 12/1993 | Riede et al. |
| 5,501,977 | A | | 3/1996 | Cruze |
| 5,630,785 | A | | 5/1997 | Pridemore et al. |
| 5,948,263 | A | | 9/1999 | Chaiko et al. |
| 5,997,749 | A | | 12/1999 | Citterbart et al. |
| 6,352,644 | B1 | | 3/2002 | Hawthorne et al. |
| 6,578,715 | B2 | | 6/2003 | Scranton, Jr. et al. |
| 6,617,150 | B1 | | 9/2003 | Hince |
| 6,749,658 | B1 | | 6/2004 | Seagren |
| 2001/0045383 | A1 | | 11/2001 | Coffman |
| 2002/0121116 | A1 | | 9/2002 | Kalra et al. |

FOREIGN PATENT DOCUMENTS

| | | |
|---|---|---|
| DE | 3713055 | 12/1988 |
| JP | 2003340427 | 12/2002 |

OTHER PUBLICATIONS

Editor Hood, Donald W. and Zimmerman, Steven T. "The Gulf of Alaska," NOAA & Department of Interior Government Printing Office, pp. 207.

* cited by examiner

*Primary Examiner*—Chester T Barry
(74) *Attorney, Agent, or Firm*—Nixon Peabody LLP

(57) ABSTRACT

The present invention relates to a method for removing oil from water or a solid surface. This involves contacting the water or the solid surface with a substance in the form of a sheet and having a high humate level under conditions effective for the substance to absorb oil from the water or the solid surface. The substance, having absorbed oil, is then recovered from the water or solid surface. In an alternative embodiment this method can be carried out where the substance is manure which may or may not be in the form of a sheet.

45 Claims, No Drawings

REMOVAL OF OILS FROM SOLID SURFACES AND WATER WITH A SUBSTANCE HAVING A HIGH HUMATE LEVEL

This application claims the benefit of U.S. Provisional Patent Application Ser. No. 60/718,479, filed Sep. 19, 2005.

FIELD OF THE INVENTION

The present invention relates to the removal of oils from solid surfaces and water with a substance having a high humate level.

BACKGROUND OF THE INVENTION

Oil spills and pollution contaminate surfaces and waters. A prime example was the Exxon Valdez shipwreck which released large quantities of oil into pristine Alaskan waters and caused very serious environmental damage. Similar polluting events occur frequently around the world. There are products and systems sold that can absorb or collect such oily wastes. However, inexpensive natural products are likely to be highly preferable, useful, and beneficial for such purposes. Materials with high levels of humic acids are known to absorb apolar organic compounds, probably by both partitioning of the organic compounds into hydrophobic regions of the humic substances and by hole filling (Xing, B., "Nonlinearity and Competitive Sorption of Hydrophobic Organic Compounds in Humic Substances," In *Humic Substances Structure Properties and Uses*, edited by G. Davies, E. A. Ghabbour and K. A. Khairy. Cambridge, UK: The Royal Society of Chemistry (1998)). However, the use of such materials as remediants for spills and the like has not been previously proposed.

There are large amounts of plant materials that are produced, as by-products of economic activities, which are themselves waste materials. Some of these materials are derived by animal processing; for example, ruminant animals can digest some lignocellulosic plant materials to a fairly high extent, ranging from about 82% for timothy grass to only 6% for ground lodgepole pine wood. The complex lignin fraction is basically unavailable to ruminants; the limit of digestion for each material is the "digestion ceiling," so that the level of lignin determines this ceiling. Some materials, such as bark from trees removed in lumber operations, waste wood removed and shredded in land-clearing operations, and the indigestable fractions of animal feeds are all produced in large quantities. These contain high levels of lignins—i.e. humic substances. In the latter case, many large confined animal operations collect manures as slurries and separate the liquid phase from solids. The liquid suspensions may be processed via anaerobic fermentation and spread on land. The solid materials may be collected, composted, and sold as low value horticultural supplements. Similarly, barks or woods may (a) be composted to a fine dark powder or (b) processed to make mulches. As with the composts produced from manure solids, the composts or mulches from waste wood products usually are sold to homeowners and landscapers as soil amendments or plant mulches. The mulch products may be divided further into aged mulches, where the material is piled and kept for several months, or raw mulches which are sold directly. The aged mulches have advantages in that salts, sugars, and soluble phenolic compounds largely have been removed. Without such processing, the wood products have potential to be phytotoxic. In general, barks, shredded waste woods and dewatered manures are wastes that are costly to dispose of, having few advantageous uses. The products produced by aging or composting yield products whose sale permits recovery of only a portion of the costs associated with their production.

Other composts may be produced from diverse materials, including food plant wastes, manures, mixed or monolithic organic waste streams from cities or towns, or, less commonly, from animal or fish wastes or flesh. Composts also frequently are formed from sewage biosolids, where anaerobic digestion may be followed by composting of the separated solids, as is the case with animal composts. Typically, composting is an aerobic process and is typified by rapid microbial growth with turning or other aerating systems within a prescribed moisture level. Thermal composting consists of three phases. In the first phase, temperatures in the compost materials begin to rise due to microbial degradation. During the second phase, due to degradation of more resistant compounds like cellulose, temperatures reach 40 to 65° C., a temperature where most microorganisms die. The composts must be turned, aerated, or otherwise handled in a second phase to achieve complete exposure to the high temperatures, ensuring microbial breakdown of available substrates and a homogenous product. Once temperatures decline due to depletion of substrates, the third, or curing phase begins, where microbial recolonization occurs and the percentage of humic substances increase. Typical composts are dark and consist largely of lignins, humic substances, and microbial biomass (Hoitink et al., "Status of Compost-amended Potting Mixes Naturally Suppressive to Soilborne Diseases of Floricultural Crops," *Plant Dis* 75(9):869-873 (1991)). This differs significantly from the aging process that may be used with wood bark materials. In the aging process, there is no turning or aeration of the materials, and, consequently, the more resistant portions of the bark or wood retain their integrity to give a fibrous, particulate material.

In a different process, known as vemicycling, temperatures are kept at a lower level (less than 55° C.) and earthworm activity is fostered by inoculation. A typical process for vermicycle composting is disclosed in U.S. Pat. No. 5,082,486. Such products may have properties that differ from those produced by thermal composting. In some cases, thermal composting is followed by vermicycling.

The substrate and process used to produce the composted materials affect the properties of the final products. However, composted or aged products can be produced that are reasonably similar from batch to batch, particularly if the compost substrate is kept constant. However, there are significant variations between composts prepared by different methods and original substrates. Therefore, production and use of any of these materials requires characterization/quality control steps in order to obtain a consistent product.

These materials are produced in large quantities, with some, especially manure solids and wood or bark waste materials, having few uses.

U.S. Pat. No. 3,771,653 teaches the use of composted plant materials that float on water for absorbing and removing oils from water surfaces. A sinking compost formulation is described that is prepared by adding one part compost to two parts sand that is adhered to the compost by the inclusion of 1% crude oil. The sand:compost mix is sufficiently dense that when added to oils on water, the compost sinks. However, sinking composts are only taught to be useful if prepared from materials that float.

U.S. Pat. No. 5,135,578 teaches the use of pellets (in accordance with U.S. Pat. No. 4,788,936) formed from poplar or aspen wood and bark treated with steam. These pellets were effective in absorbing oils from water or sand at a ratio of one part of oil by weight to one part of pellets. A fine net is spread over the oil slick in water before the compost was air dropped. The netted produce is ultimately hauled away.

U.S. Pat. No. 5,795,842 teaches an oil absorbing article with an outer layer of oil-absorbent felt surrounding pine bark. The oil absorbing materials of Japanese Patent Application Serial Nos. 2002180447 and 20002233182 are similar, except that the outer material differs. Likewise, Japanese Patent Application Serial No. 20002233182 describes the use of large pieces of bark contained in a net with an internal rope.

Japanese Patent Application Serial No. 6134299 discloses the production of wood bark treated with a hydrophobic and aseptic agent for the absorption of oil.

U.S. Pat. No. 5,044,324 teaches that grists of assorted wood types are combined and admixed, dried, moisturized, pelletized, and ground to form 'crumbles.' These manufactured products can then be used to absorb animal excretions and petroleum.

U.S. Patent Publication No. 20030085174 relates to the use of cellulose-based materials packed into a column for decontamination of various biological fluids. However, the inventors of the present application have found that cellulose-containing materials are not effective, and, in fact, materials with high levels of cellulose work quite poorly.

In commercial practice today, there are several materials that are used in large quantities for removal of oil. Those intended for use on solid surfaces, such as filling station and garage floors, tend to be cheap and are dominated by loose clay-based products, composed entirely or primarily of montmorillonite, bentonite, or similar dried and granulated clays. These materials are very inexpensive and are similar to "kitty litter" type products. They have relatively high bulk densities and may form slimy layers when wet. They also have low oil-holding capacities.

For oil removal from water, spill kits for oily wastes, and other demanding applications, petroleum-derived products, such as pads formed of melt-blown polypropylene (e.g., the linings of baby diapers), are materials of choice. These materials are robust and have much higher oil holding capacities per unit weight than clays, but they are prepared from petroleum and are, therefore, sensitive to increases in the price of crude oil.

Other materials are used as well but in smaller quantities. One example is peat moss, which is a nonrenewable resource. However, its cost is also increasing as peat becomes a more scarce resource.

The present invention is directed to overcoming the deficiencies in the art.

SUMMARY OF THE INVENTION

The present invention relates to a method for removing oil from water or a solid surface. This involves contacting the water or the solid surface with a manure under conditions effective for the manure to absorb oil from the water or the solid surface. The manure, having absorbed oil, is then recovered from the water or solid surface.

Another aspect of the present invention relates to a method for removing oil from water or a solid surface. This involves contacting the water or the solid surface with a substance in the form of a sheet and having a high humate level under conditions effective for the substance to absorb oil from the water or the solid surface. The substance, having absorbed oil, is then recovered from the water or solid surface.

The method of the present invention is highly effective for large-scale removal of contamination from surfaces or water. This can be achieved by addition of the substance of the present invention to the water or solid surfaces or by filtration systems to remove dissolved/suspended apolar compounds.

The method of preparation of oil absorbents from composts or other lignaceous substances is quite simple. The substance may be ground and/or screened to provide a substance with a relatively homogenous size distribution and then is dried at 30 to 500° C. The method of use of the substances so produced also is straight-forward: for solid surfaces, because the substance is simply spread or applied to the contaminated surface in an amount necessary to absorb the contaminant. A short time later, the substance is swept up or otherwise removed with the oil absorbed to the material. For application to oily films or layers on water, the substances are spread on the water or oil surface. After they absorb the oil, they either sink or remain floating, depending upon the specific substance used. The substance of the present invention is highly efficient in absorbing oils—i.e., at a minimum, 1 g of substance will absorb 1 g of oil.

The uses and differences between sinking and floating substances are important for the purposes of the present invention. Floating substances have potentially many uses. For example, they can be spread as a dry particulate onto waters that contain an oily layer or film. The composts aggregate with the oil, forming easily recovered clumps. These can be removed by skimming or vacuuming through a relatively coarse screen. The oily particulate aggregates are retained, and the resulting oil-free water may then be discharged back into the waterway.

Other materials aggregate with oils, but because of their composition and initial bulk density the aggregate becomes heavier than water and thus sinks. Such materials are extremely useful where waterfowl, beaches, or other features must be protected from floating oils and where the sinking of the substances to the bottom of the waterway is acceptable as an immediate emergency need. Other times, the sinking substances may be useful to remove or recover oily materials that can be sunk to the bottom of a designed recovery vessel or basin.

It will also be appreciated that the oil-aggregating abilities of the substance used in accordance with the present invention are useful for recovery of oils on solid surfaces, such as floors, soils, or sands. The aggregating abilities of the substances with oils makes recovery by vacuuming or sweeping a simple matter. Plus, they work well in wet surfaces, a characteristic absent in clay-based absorbents which form heavy muds in the presence of moisture Lignacious materials are organic compounds that burn readily. Thus, after contaminants are absorbed and removed from water or surfaces, the resulting material may be disposed of by burning.

If the substance of the present invention is added to soils contaminated with apolar organic compounds, preferably without drying, then it will provide a high inoculum level of microbes, at least some of which degrade pollutants. The presence of such a microbial community in the substance of the present invention makes those substances useful in degrading oils or other apolar compounds during composting or composting-like processes.

In the preferred embodiment of this invention, the substances used are lignocellulosic or composted materials that are otherwise waste materials that have little value but that must be produced and disposed of. Therefore, the substances described herein are highly economical and from renewal sources.

The substances described in this invention may be used in bulk form, similar to the clays and peats described above. They may also be formulated using nonwoven technologies to form pads, sheets, and booms that can be used in a manner similar to that of the polypropylene materials. Nonwoven systems can include natural and synthetic fibers; the most common nonwoven article in use today is paper. The natural fibers used as the forming materials may include wood pulp, kenaf, cotton fibers, or similar materials. In addition, a number of other fibers may also be used, including polypropylene, polyesters such as poly(trimethlene) terphalate (PET), and similar materials. Other methods of formulating include layering of the substances between sheets of suitable substances such as mesh or plastic foams.

Similar substances can be used for economical heavy metal removal and reclamation from waters. Thus, the same substances can be used for removal of both heavy metals and apolar compounds, such as oils, where such contaminants occur in the same body of water.

The examples of the present patent application compare a number of materials, including composts from various sources, barks or woods, and manures as loose substances for removal from solid or water surfaces.

It also provides several novel alternative formulations of these substances that are highly effective for the applications described herein with barks and manures being the most effective substances discovered.

Finally, while oily aggregates can be disposed of by burning, it can be appreciated that some mixtures can result in rapid combustion. For these applications, the present invention envisions adding a fire retardant, such as boric acid, to the substances to lessen the danger of combustion.

DETAILED DESCRIPTION OF THE INVENTION

The present invention relates to a method for removing oil from water or a solid surface. This involves contacting the water or the solid surface with a substance in the form of a sheet and having a high humate level under conditions effective for the substance to absorb oil from the water or the solid surface. The substance, having absorbed oil, is then recovered from the water or solid surface.

The substance of the present invention contains high levels of humic materials. Composts can be considered to be some steps along the pathway between unaltered organic materials and coals, with similarities to Leonardites, lignites, and peats (Ozboda et al., Leonardite and Humified Organic Matter," In *Humic Substances Structures, Models and Functions*, edited by E. A. Ghabbour and G. Davies. Cambridge, U. K.: The Royal Society of Chemistry (2001), which is hereby incorporated by reference in its entirety). Thus, the present invention includes humate ores and noncomposted biological materials, including the coals, lignites, Leonardites, peats, and other humates.

A humic substances comprises an "extraordinarily complex, amorphous mixture of highly heterogeneous, chemically reactive yet refractory molecules, produced during early biogenesis in the decay of biomatter, and formed ubiquitously in the environment via processes involving chemical reaction of species randomly chosen from a pool of diverse molecules and through random chemical alteration of precursor molecules." See MacCarthy, P., "The Principles of Humic Substances: An Introduction to the First Principle," In *Humic Substances: Structures, Models and Functions*, edited by E. A. Ghabbour and G. Davies. Cambridge, UK: Royal Society of Chemistry (2001), which is hereby incorporated by reference in its entirety).

Generally, humic substances contain a hydrophobic framework of aromatic rings linked by more flexible carbon chains, with alcohol, carboxylic, carbonyl, phenolic, and quinone functional groups. They also contain a high level of bound free radicals, which increases their reactivity in the present invention. Thus, depending on pH and other parameters, humic substances efficiently bind particular ions (Davies et al., Preface. In *Humic Substances: Structures, Properties and Uses*, edited by G. Davies, E. A. Ghabbour and K. A. Khairy. Cambridge, UK: Royal Chemical Society (1998), which is hereby incorporated by reference in its entirety).

Humic substances are composed of several general fractions, as follows:

Humins: Humins are the most coal-like of the humic substances and are insoluble in aqueous solutions, regardless of pH. The humins contain more aromatic substances than the soluble fractions noted below (Davies et al., Preface. In *Humic Substances: Structures, Properties and Uses*, edited by G. Davies, E. A. Ghabbour and K. A. Khairy. Cambridge, UK: Royal Chemical Society (1998), which is hereby incorporated by reference in its entirety) and, therefore, are more nonpolar. They generally have a weaker ability to retain water, to act as sorbents, and to bind metals than the substances that follow.

Humic acids: Humic acids can be dissolved in alkaline aqueous solvents and are generally insoluble at acid pHs. They contain numerous side groups such as the ones noted above.

Fulvic acids: Fulvic acids are generally smaller than humic acids and dissolve in water regardless of pH, but otherwise are generally similar.

It is desirable that the substance comprise a humic material capable of absorbing, and aggregating with, oil, with 1 g of the substance being capable of absorbing at least 1 g of oil.

When the substance is aged ground wood or bark, the aged wood or bark has a level of leachable salts of 0.05 to 1.0 ppm when mixed with water in a wood or bark to water ratio of 1:5 for one hour on a rotary shaker and separated by filtration to produce a filtrate with a conductivity of less than 1 mSeimen/cm. Desirably, the wood or bark is in the form of particles with a size of less than 1 mm.

Where the substance is dewatered cow manure, it is desirable that it be treated to kill all coliform bacteria.

Prior to the contacting step, the substance of the present invention can be dried at an elevated temperature to reduce the moisture level of the substance to a relative humidity of 45% or less. Such drying can be carried out with any known conventional dryer, including rotary dryers, flow-through belt dryers, solar dryers, or agricultural drying systems.

The pollutants to be removed in accordance with the present invention include petroleum-based oils and other hydrocarbons, rocket fuel, solvents, pesticides, explosives, industrial chemicals (e.g., toluene), polycyclic aromatics, paints and other similar materials. The present invention also provides methods for removal of slightly polar compounds that are dissolved in aqueous solvents, such as acetone and other carbonyl containing materials, alcohols, and industrial and organic pollutants, such as the gasoline additive MBTE.

In removing oils from water, the contacting step can be carried out by passing the water through a filter comprising the substance.

When oil is removed from soil, the contacting step is carried out by adding humic substances and/or compost materials to the soil to provide a microbial inoculum source and substrate for decomposing oil.

The contacting step of the present invention can be carried out with the substance being in the form of a sheet. In particular, in carrying out this aspect of the present invention, either the substance itself forms the sheet or the substance is used to fill sheets made of other materials. The sheet can be formed from agricultural waste products, humic substances, or mixtures thereof. When agricultural waste products are used to form the sheet, the sheet comprises 3 to 97 wt % of the agricultural waste products, preferably 20 to 80 wt % of the agricultural waste products, and more preferably at least 30 to 80 wt % of the agricultural waste products.

The sheet desirably comprises synthetic fibers, natural fibers, or combinations thereof.

The synthetic fibers can be made from any of the following materials: polypropylene, PET, polyester, acrylic, rayon, acetate, liquid crystal polymers, aramids, polyphenylene sulfide, fiberglass, polybenzimidazole, melamine, polyvinyl chloride, ceramics, polyethylene, polyvinyl alcohol, or combinations thereof.

The natural fibers can be made from any of the following materials: kenaf, wood pulp, hemp, cotton, jute, abaca, kapok, canton, pacol, ramie, maguey, sisal, pina, buntal, cabo negro, coir, or combinations thereof.

The sheet is desirably a nonwoven material.

The sheet is prepared by applying the substance to a previously formed sheet. Such applying is carried out by spraying, coating, or dusting the substance on the previously formed sheet.

In one aspect of the present invention, after the recovery step of the process of the present invention, the substance, having absorbed oil, may be combusted. Desirably, the substance is subjected to pressing following the recovering step and prior to the combusting step under conditions effective to remove oil from the substance.

In another aspect of the present invention, the substance, having absorbed oil, is subjected to composting following the recovering step to decontaminate the substance by degradation of the oil. Where the substance is in the form of a sheet, it is desirable that sheet used in accordance with this aspect of the present invention comprise biodegradable fibers suitable to be decomposed during the composting step.

A fire retardant material can be added to the substance following the recovering step to reduce the substance's flammability. A suitable fire retardant material is boric acid or salts thereof.

Another aspect of the present invention relates to a method for removing oil from water or a solid surface. This involves contacting the water or the solid surface with a manure under conditions effective for the manure to absorb oil from the water or the solid surface. The manure, having absorbed oil, is then recovered from the water or solid surface. This aspect of the present invention is carried out using substantially the same steps and operating conditions as described above, to treat substantially the same oils as described above.

EXAMPLES

Example 1

Substances

In experiments exemplifying the present invention, the following substances were utilized.

Andre compost: This substance was prepared by Andre Farms, Wauseon, Ohio by thermal composting of mixed yard and plant wastes.

EC001: This is a commercial compost obtained from Environmental Credit Corporation, State College, Pa.

Geneva municipal sludge compost: This substance was prepared by the city of Geneva, N.Y. The process consists of dewatering of sewage sludge from an anaerobic fermentation, mixing with hardwood sawdust, and, then, composting thermally with aeration in a silo and secondarily in piles that were turned periodically.

Mushroom compost: Mushroom compost is the substance that remains after culture and harvest of mushrooms, mostly *Agaricus* spp. The mushrooming process itself is a compost-like process; the starting materials are horse manure and straw.

Dewatered dairy cow manure: Large dairy farms and other contained animal facilities must deal with copious quantities of manure. One method of dealing with this is to suspend the manure and urine in water and then to separate the solids and the liquids. The solids are separated from the liquids by appropriate compression equipment and the dewatered manure is conveyed to another location for disposal or processing. It should be noted that the cow-processed substances will be rich in lignins and humates, because these are the indigestible parts of the plant based feeds. This substance, when dried is particulate and light tan in color and free of objectionable odors. The material used in these tests was obtained from the Fessenden Dairy, LLC, King's Ferry, N.Y.

Processed cow manure: As noted earlier, some enclosed animal operations minimally process manures. In this case, manures that are dewatered as noted above may be passed through a device that, in the course of about three days, slowly turns and aerates the manure. This results in substantial microbial action such that the mixtures are heated sufficiently to kill pathogens (approximately 65° C.). This also results in some drying of the substance due to the heating and aeration, permitting the resulting processed manure to be returned to dairy barns for bedding. The resulting substance is a well aerated product that is substantially fibrous and should have much of its available cellulose and soluble materials removed during this process.

Cow manure compost: The same substance as described above is frequently subjected to standard thermal composting, to give a product that is primarily used as a horticultural soil amendment. This substance was also obtained from the Fessenden Dairy.

Cow manure vermicycle compost: As noted earlier, thermal composting may be followed by vermicycle composting, in which the composted substance is further degraded by the action of earthworms.

Aged hardwood bark: Hardwood bark was obtained from local sawmills by Sensenig's Mulch and Landscaping, Geneva, N.Y. This substance was placed in large piles and allowed to age for several months. The resulting dark brown substance can be ground to any desired size and it is sold as a mulch for plants.

Aged ground wood: A similar mixture composed of the entire biomass from forest clearing operations obtained by grinding the stumps and stems of trees: this was followed by ageing as in the example above.

Example 2

Characterization of Materials

The substances described in Example 1 were characterized for important properties using the methods that follow. In most cases, the Test Methods for the Examination of Composting and Composts (TMECC) from the US Composting Council were used, with the TMECC numbers in the following section referring to specific method recommended by the Council. The substances were dried at about 40° C. and sieved with an 8 and then a 35 mesh screen to produce a substance with dimensions between 0.5 and 2.4 mm.

Water holding capacity: Seventy-five ml of loose-packed field compost were added to a tared 100 ml graduated cylinder and weighed. Distilled water was added to the 100 ml mark and let stand 1 hr to absorb water. The volume of swelling was recorded. The cylinder was inverted to drain for 1 hr. The weight of water retained per unit weight of added compost is the water holding capacity (TMECC 03.10). The WHC value may be revised for some applications by including the "Moisture Content" determined in TMECC 03.09 in the calculations.

pH and conductivity: The pH values and conductivity are necessary to appropriately use the composts in accordance with the present invention. For example, pH will affect metal binding and conductivity measured as a function of soluble salts. Both may affect acceptability for environmental remediation and heavy metal binding capacity. A 1:5 slurry (air-dried compost:distilled water) is mixed for one hour on a rotary shaker and then separated by filtration or centrifugation. The conductivity of the filtrate is measured at room temperature, and the pH of the liquid is also determined. These data are recorded as per TMECC 04.10 and TMECC 04.11, respectively. The conductivity values can be converted to ppm of total soluble ionizable solids by multiplying by 0.66. By way of comparison, deionized water contains about 0.07 ppm, drinking water about 0.9 ppm, and sea water about 35 ppm of total ionizable solids. Highly soluble salt levels will flag samples for cation determination by AA or ion chromatography. The extracted compost is again suspended in a five-fold excess of water for at least one hour and again filtered or centrifuged. The combined extracts were used for later measurement of the leachable humic and fulvic acids as described below.

Soluble humic and fulvic acids: The optical density at 540 nm of the combined solution is used for pH and conductivity measurements and second extract is measured. The pH is adjusted to 10.8 for standardization. This measures the amount of soluble colored compounds, primarily humic and fulvic acids. Excessive levels of soluble humic and fulvic acids are objectionable for some applications, particularly where materials are added to smaller bodies of water and where color leached from the materials will be noticeable.

The characterization data follow:

Andre Compost

| | |
|---|---|
| Bulk density | 0.48 g/ml. |
| Moisture content (after drying at about 40 C.) | 3.33% |
| Water holding capacity | 1.57 ml/g |
| pH | 7.95 |
| Conductivity | 4.8 mS (equivalent to 3.2 ppm ionizable solids) |
| $OD_{540}$ | 4.4 |

Geneva Municipal Sludge Compost

| | |
|---|---|
| Bulk density | 0.24 g/ml |
| Moisture content | 5.81% |
| Water holding capacity | 1.67 g/ml |
| pH | 6.1 |
| Conductivity | 2.8 mS (equivalent to 1.8 ppm ionizable solids) |
| $OD_{540}$ | 6.8 |

Mushroom Compost

| | |
|---|---|
| Bulk density | 0.44 g/ml |
| Moisture content | 5.70% |
| Water holding capacity | 1.93 g/ml |
| pH | 7.8 |
| Conductivity | 6.87 mS (equivalent to 4.5 ppm ionizable solids) |
| $OD_{540}$ | 4.7 |

Dewatered Dairy Cow Manure

| | |
|---|---|
| Bulk density | 0.13 g/ml |
| Moisture content | 5.28% |
| Water holding capacity | 8.39 g/ml |
| pH | 8.4 |
| Conductivity | 7.6 mS (equivalent to 5.0 ppm ionizable solids) |
| $OD_{540}$ | 12.5 |

Cow Manure Compost:

| | |
|---|---|
| Bulk density | 0.29 g/ml |
| Moisture content | 4.7% |
| Water holding capacity | 2.98 g/ml |
| pH | 8.4 |
| Conductivity | 7.9 mS (equivalent to 5.2 ppm ionizable solids) |
| $OD_{540}$ | 17 |

Aged Hardwood Bark:

| | |
|---|---|
| Bulk density | 0.23 g/ml |
| Moisture content | 7.1% |
| Water holding capacity | 3.7 g/ml |
| pH | 7.6 |
| Conductivity | 0.36 mS (equivalent to 0.24 ppm ionizable solids) |
| $OD_{540}$ | 1.9 |

Aged Ground Wood:

| | |
|---|---|
| Bulk density | 0.22 g/ml |
| Moisture content | 4.8% |
| Water holding capacity | 1.1 |
| pH | 8.0 |
| Conductivity | 0.47 mS (equivalent to 0.31 ppm ionizable solids) |
| $OD_{540}$ | 1.9 |

Example 3

Oil Absorption Capacity

Ten grams of the test materials were added to a tared cylinder, 50 ml test material was added, and the test material-oil mixture was allowed to equilibrate for two hours. The mouth of the cylinder was covered with a screen and the screen affixed. The cylinder was placed upside down and allowed to drain for twenty hours. The drained oil was weighed, and the amount absorbed calculated as the difference. The difference between the weight of the original oil and the recovered oil is considered the oil holding capacity. The results follow.

| MATERIAL | OIL ABSORBED (g) | OIL ABSORBED/ GRAM COMPOST |
|---|---|---|
| 1. Processed dairy manure | 33.3 | 3.33 g/g manure |
| 2. Aged pine bark | 33.5 g | 3.35 g oil/g bark |
| 3. Dried dairy manure | 31.8 | 3.18 g oil/g manure |
| 4. Fresh pine bark | 23.6 | 2.36 g oil/g bark |
| 5. Geneva sewage compost | 23 | 2.30 g oil/g compost |
| 6. Manure compost | 19.8 | 1.98 g oil/g compost |
| 7. Hardwood bark | 17.8 | 1.78 g oil/g bark |
| 8. Mushroom Compost | 13.5 | 1.35 g oil/g compost |
| 9. Aged ground wood | 13.2 | 1.32 g oil/g wood |
| 10. Andre composts | 10.6 | 1.06 g oil/g compost |
| 11. Fessenden Vermicomp | 10.1 | 1.01 g oil/g compost |

These materials all absorb oil more effectively than the 'kitty litter' type products that are the standard in the industry. For example, a typical clay type absorbent from the Moultan Company with the trade name Oil Absorbent contains amorphous montmorillonite clay and crystalline silica, with less than 10% of the clay having an oil holding capacity of 0.67 g oil/g/material.

These data demonstrate that there are very significant differences in the abilities of the materials to hold and absorb oil. Further, it also demonstrates that the composted material, where the cellular structure in the original material was largely destroyed, is not very effective as compared with any of the materials where cellular structures are present, as they are in the first four materials. The exception to this is aged ground wood, where cellular structure is present. The difference is believed to result from the fact that the ground wood is primarily cellulosic and not heavily lignified. The manures, by contrast, due to the processing in the cow digestive process, have had much of the available cellulose removed. This will enhance the relative abundance of lignins, indicating that lignins are more important than cellulosic materials in oil absorption. In fact, high levels of cellulose are detrimental to the oil absorbing capabilities of materials. The apparent exception of the sewage compost can be explained by the fact that oak sawdust, a highly lignaceous material, is added to the sewage sludge to aid in aeration.

Example 4

Oil Removal from Water

The composts were screened through a 12 mesh screen and dried at 100 or 150° C. Twenty ml (18 g) of motor oil (Valvoline, 30 W nondetergent) was added to 200 ml of water contained in a screw cap jar to give water overlain by an oil layer.

Different amounts of each of the test materials were added to the oil, to give ratios of 1:1, 1.5:1, and 2:1 of the test materials:oil. With all of the test materials, the oil, and compost aggregated into clumps. In some cases, the oil:compost aggregate floated on the surface of the water, and, in other cases, it sank. The oil and compost mixtures were separated by sieving through a tea strainer (mesh size about 1 mm) that removed the oil compost mixture. To determine the extent to which the water was cleansed of oil, the water was extracted with hexane, and the hexane phase, which contained any residual oil, was taken to dryness in a tared dish. The % of the total amount of oil that remained was calculated. This data, together with observations on sinking or floating, follow:

| Material | Sinking/ Floating | % Oil Removed At Different Ratios | | |
|---|---|---|---|---|
| | | 1:1 | 1.5:1 | 2:1 |
| Andre compost | Sinking | 99.5 | 97.4 | 95 |
| Geneva mun. sewage sludge | Floating | 99.8 | 99.8 | 99.2 |
| EC001 compost | Sinking | 99.4 | 99.2 | 88.6 |
| Mushroom compost | Sinking | 99.5 | 97.3 | 82.3 |
| Dewatered cow manure | Floating | 99.7 | 99.8 | 99.5 |
| Cow manure compost | Floating | 99.7 | 98.7 | 96 |
| Aged hardwood bark | Floating | 99.7 | 99.8 | 97.5 |
| Aged ground wood | Floating | 99.4 | 99.2 | 96.7 |

These results demonstrate that the composts are highly effective in removing oil from water.

The Geneva compost material remained at the oil-water interface, but the oil layer was absorbed. The oil was completely removed from the water by addition of another 0.5 g of compost. The oil-compost mixture could be readily recovered by filtration or skimming.

Depending on the composition of the composts, a formulation that either sinks or floats can be produced. For different applications, either type may be desirable.

It is clear from this result that oils on surfaces also can be absorbed and removed.

It is anticipated that apolar materials dissolved/suspended in water can be removed by filtration systems using the materials of the present invention.

Example 5

Removal of Oil from a Solid Surface

Ten g of 30 W oil was added to a tared flat aluminum pan. The test material was added in increments until the pan surface was nonoily to touch. The amount of material required to completely remove the oil was measured. The data follow.

| material | total volume to absorb 20 ml oil | total weight to absorb 20 mls oil |
|---|---|---|
| Unaged Pine Bark Fines 35 mesh (500 μm) particles and smaller | 30 ml | 7.1 g |
| Aged Pine Bark fines and smaller | 25 | 7.4 |
| Unaged Pine 25 Mesh (710 μm) and smaller | 35 | 8 |
| Manure Oil Master 25 Mesh and smaller | 45 | 8 |
| Aged Pine 20 Mesh (850 μm) and smaller | 35 | 9 |
| Aged Pine 25 Mesh | 35 | 9.7 |
| Aged Pine 16 Mesh (1.18 mm and smaller) | 45 | 10 |
| Hardwood Bark Fines and smaller | 30 | 11 |
| Aged Pine 12 mesh (1.7 mm) and smaller | 50 | 11.1 |
| Clay-silica absorbent | 100 | 72 |

The last item in the list is a typical clay type absorbent widely used to remove oil from surfaces as described in Example 4.

This example clearly demonstrates the very good performance of the materials of the present invention compared to the clay-silica standard. It also demonstrates that bark particles must be sized to a fine particle if it is to be effective, typically less than 25 mesh (850 mm and smaller particles). This sizing is accomplished by passing these particles through an appropriately sized screen.

Example 6

Oil Holding Capacity of Formulated Materials

The procedure used here was very similar to that used in Example 3. The materials were in sheets which were cut into squares and then used as in Example 3. As a check, the standard polypropylene meltblown sheet material used commercially was tested.

| MATERIAL | GRAMS OIL ABSORBED/GRAM PAD |
| --- | --- |
| Polypropylene | 9.7 g oil/g pad |
| Series 4 | 8 g oil/g pad |
| Series 2 | 7.25 g oil/g pad |
| Series 3 | 6.87 g oil/g pad |
| Series 6 | 5.23 g oil/g pad |
| Series 5 | 4.63 g oil/g pad |
| Series 1 | 4.2 g oil/g pad |

These results demonstrate that materials composed at least partially of inexpensive renewable resources can be used to replace materials such as pure polypropylene nonwoven pads with little loss of efficacy. Moreover, some of the materials as formulated were more effective than polypropylene in removing oil on an area basis. For example, the polypropylene standard took up 2.7 L/m$^2$, while the series 2 pads took up 4.0 L/m$^2$ and the series 3 pads took up 3.0 L/m$^2$.

Example 7

Removal of Oil from a Flat Surface

The protocol used here is essentially the same as in Example 5. Oil was added to the flat pan and weighed squares of the test materials were added to the material.

| Material | Grams needed to remove 10 ml oil |
| --- | --- |
| Polypropylene | 1.4 |
| Series 2 | 1.7 |
| Series 3 | 1.9 |
| Series 6 | 2.1 |
| Series 1-1 | 2.3 |
| Series 1-1 | 2.3 |
| Series 4 | 2.4 |
| Series 5 | 2.7 |

Although preferred embodiments have been depicted and described in detail herein, it will be apparent to those skilled in the relevant art that various modifications, additions, substitutions, and the like can be made without departing from the spirit of the present invention and these are therefore considered to be within the scope of the present invention as defined in the claims which follow.

What is claimed:

1. A method for removing oil from water or a solid surface, said method comprising:
   contacting the water or the solid surface with a manure under conditions effective for the manure to absorb oil from the water or the solid surface and
   recovering the manure, having absorbed oil, from the water or solid surface.

2. The method of claim 1 further comprising:
   drying the manure, prior to said contacting, at an elevated temperature above ambient to reduce the moisture level of the manure to a relative humidity of 45% or less.

3. The method of claim 1, wherein oil is removed from water.

4. The method of claim 3, wherein the oil is selected from the group consisting of gasoline additives, alcohols, pesticides, and acetone.

5. The method of claim 3, wherein said contacting is carried out by passing the water through a filter comprising the manure.

6. The method of claim 1, wherein oil is removed from soil.

7. The method of claim 6, wherein said contacting comprises:
   adding humic substances and/or compost materials to the soil to provide a microbial inoculum source and substrate for decomposing oil.

8. The method of claim 6, wherein the oil is selected from the group consisting of explosives, pesticides, organic solvents, polycyclic aromatic hydrocarbons, petroleum, rocket fuel, and organic pollutants.

9. The method of claim 1 further comprising:
   combusting the manure, having absorbed oil, following said recovering.

10. The method of claim 9 further comprising:
    subjecting the manure to pressing following said recovering and prior to said combusting under conditions to remove oil from the substance.

11. The method of claim 1 further comprising:
    composting the manure, having absorbed oil, following said recovering to decontaminate the manure by degradation of the oil.

12. The method of claim 1 further comprising:
    adding a fire retardant material to the manure following said recovering to reduce the manure's flammability.

13. The method of claim 12, wherein the fire retardant material is boric acid or salts thereof.

14. The method of claim 1, wherein the manure is capable of absorbing, and aggregating with, oil, with 1 g of the manure being capable of absorbing at least 1 g of oil.

15. The method of claim 1, wherein the manure has been treated to kill all coliform bacteria.

16. A method for removing oil from water or a solid surface, said method comprising:
    contacting the water or the solid surface with a substance in the form of a sheet and having a high humate level under conditions effective for the substance to absorb oil from the water or the solid surface and
    recovering the substance, having absorbed oil, from the water or solid surface.

17. The method of claim 16 further comprising:
    drying the substance, prior to said contacting, at an elevated temperature above ambient to reduce the moisture level of the substance to a relative humidity of 45% or less.

18. The method of claim 16, wherein oil is removed from water.

19. The method of claim 18, wherein the oil is selected from the group consisting of gasoline additives, alcohols, pesticides, and acetone.

20. The method of claim 18, wherein said contacting is carried out by passing the water through a filter comprising the substance.

21. The method of claim 16, wherein oil is removed from soil.

22. The method of claim 21, wherein said contacting comprises:
adding humic substances and/or compost materials to the soil to provide a microbial inoculum source and substrate for decomposing oil.

23. The method of claim 21, wherein the oil is selected from the group consisting of explosives, pesticides, organic solvents, polycyclic aromatic hydrocarbons, petroleum, rocket fuel, and organic pollutants.

24. The method of claim 16, wherein the sheet is formed from agricultural waste products, humic substances, or mixtures thereof.

25. The method of claim 24, wherein the sheet comprises 3 to 97 wt % of the agricultural waste products.

26. The method of claim 25, wherein the sheet comprises 20 to 80 wt % of the agricultural waste products.

27. The method of claim 26, wherein the sheet comprises at least 30 wt % of the agricultural waste products.

28. The method of claim 16, wherein the sheet comprises synthetic fibers.

29. The method of claim 28, wherein the synthetic fibers are made from a material selected from the group consisting of polypropylene, PET, polyester, acrylic, rayon, acetate, liquid crystal polymers, aramids, polyphenylene sulfide, fiberglass, polybenzimidazole, melamine, polyvinyl chloride, ceramics, polyethylene, polyvinyl alcohol, and combinations thereof.

30. The method of claim 16, wherein the sheet comprises natural fibers.

31. The method of claim 30, wherein the natural fibers are made from a material selected from the group consisting of kenaf, wood pulp, hemp, cotton, jute, abaca, kapok, canton, pacol, ramie, maguey, sisal, pina, buntal, cabo negro, coir, and combinations thereof.

32. The methods of claim 16, wherein the sheet comprises a mixture of natural fibers and synthetic fibers.

33. The method of claim 16, wherein the sheet comprises a nonwoven material.

34. The method of claim 16, wherein the sheet is prepared by applying the substance to a previously formed sheet.

35. The method of claim 34, wherein said applying is carried out by spraying, coating, or dusting the substance on the previously formed sheet.

36. The method of claim 16 further comprising:
combusting the substance, having absorbed oil, following said recovering.

37. The method of claim 36 further comprising:
subjecting the substance to pressing following said recovering and prior to said combusting under conditions to remove oil from the substance.

38. The method of claim 16 further comprising:
composting the substance, having absorbed oil, following said recovering to decontaminate the substance by degradation of the oil.

39. The method of claim 38, wherein the substance comprises biodegradable fibers suitable to be decomposed during said composting.

40. The method of claim 16 further comprising:
adding a fire retardant material to the substance following said recovering to reduce the substance's flammability.

41. The method of claim 40, wherein the fire retardant material is boric acid or salts thereof.

42. The method of claim 16, wherein the substance comprises a humic material capable of absorbing, and aggregating with, oil, with 1 g of the substance being capable of absorbing at least 1 g of oil.

43. The method of claim 16, wherein the substance is aged ground wood or bark.

44. The method of claim 43, wherein the aged wood or bark has a level of leachable salts of 0.05 to 1.0 ppm when mixed with water in a wood or bark to water ratio of 1:5 for one hour on a rotary shaker and separated by filtration to produce a filtrate with a conductivity of less than 1 mSeimen/cm.

45. The method of claim 43, wherein the wood or bark is in the form of particles with a size of less than 1 mm.

* * * * *